United States Patent [19]

Reinicke

[11] Patent Number: 5,450,876

[45] Date of Patent: Sep. 19, 1995

[54] MAGNETICALLY LINKED VALVE CONSTRUCTION

[75] Inventor: Robert H. Reinicke, Mission Viejo, Calif.

[73] Assignee: Marotta Scientific Controls, Inc., Montville, N.J.

[21] Appl. No.: 241,605

[22] Filed: May 11, 1994

[51] Int. Cl.$^6$ .............................................. F16K 37/00
[52] U.S. Cl. ............................... 137/614.19; 137/312; 137/557; 137/559; 251/129.16; 251/129.21
[58] Field of Search ................ 251/129.21, 129.16; 137/312, 559, 551, 557, 614.19

[56] References Cited

U.S. PATENT DOCUMENTS

| | | | |
|---|---|---|---|
| 3,462,116 | 8/1969 | Wright, Jr. | 251/129.21 |
| 4,575,005 | 3/1986 | Giraudi | 251/129.21 |
| 4,653,525 | 3/1987 | Young | 251/129.21 |
| 5,170,659 | 12/1992 | Kemp | 137/557 |
| 5,199,459 | 4/1993 | Mullally | 251/129.21 |

*Primary Examiner*—A. Michael Chambers
*Attorney, Agent, or Firm*—Hopgood, Calimafde Kalil & Judlowe

[57] ABSTRACT

An electro-magnetically actuated twin-valve system wherein the respective valves are series-connected within a single housing and in a single generally axial line of fluid flow from an upstream or inlet end to a downstream or outlet end, and wherein an annular electrical winding is operative to concurrently operate both valves for a like change of state in each valve. A generally toroidal configuration of magnetic-core elements is provided by generally cylindrical housing structure which includes annular end-closure elements and wherein the core path is completed by magnetic armature and pole-face features. The annular winding is magnetically coupled to the armatures and is contained within the generally toroidal configuration of magnetic-core elements. Separate springs axially preload the armatures in their valve-closed direction of engagement with annular valve-seat formations along the path of flow. And provision is made for independent testing of the sealing effectiveness of each valve closure, prior to operation of the twin-valve system.

12 Claims, 2 Drawing Sheets

MAGNETICALLY LINKED VALVE CONSTRUCTION

BACKGROUND OF THE INVENTION

The invention relates to an electromagnetically operated valve construction, wherein a single magnetic circuit places plural valve members of magnetic material in series magnetically interlinked relation, for plural valves that are in series relation on a single line of fluid flow, such that a single electrical excitation coupled to the single magnetic circuit can simultaneously operate the plural valves, for redundant assurance of at least a shut-off condition in the single line of fluid flow.

U.S. Pat. Nos. 3,443,585, 3,472,277 and 4,223,698 disclose various magnetically actuated valve systems wherein a single electromagnetic excitation will actuate each of two valve members, each of which serves its own pressure-fluid flow. In U.S. Pat. No. 3,443,585, a permanent magnet is the common middle leg of two separate solenoid-actuated magnetic circuits. Excitation of one solenoid opens both valves; excitation of the other solenoid closes both valves, and the permanent magnet holds the actuated condition of both valves. U.S. Pat. Nos. 3,472,277 and 4,223,698 each disclose an electromagnetic actuating system wherein a single solenoid coil actuates two magnetically linked valves to open condition, against the compliant action of springs to load valve members in the valve-closing direction. In all cases, construction is highly specialized and complex, leading to unduly expensive products.

Pending U.S. patent application Ser. No. 08/194,722, filed in February 1994 discloses a simpler construction for the case of a single solenoid coil to actuate two magnetically linked valves to open condition in each of two lines of fluid flow, but there is a need for the safety assurance of a single solenoid coil to actuate two or more magnetically linked valves that are in series relation on the same single line of fluid flow, as when a particular line of rocket-fuel supply must be positively and rapidly shut down.

BRIEF STATEMENT OF THE INVENTION

It is an object of the invention to provide an improved electromagnetically actuated multiple-valve construction of the character indicated.

A specific object is to meet the above object with a novel construction within a single housing which contains each of two series-connected valves and a single magnetic circuit for concurrently operating both valves.

Another specific object is to provide a mono-fluid valve construction meeting the above objects and providing series-redundant shut-off and sealing capability, illustratively for space-satellite application as a hydrazine monopropellant thruster valve.

A further specific object is to achieve the above objects with minimum friction and with provision for independent testing of each of the component valves for sealing capability in its valve-closed condition.

It is also an object to meet the above objects with a relatively simple construction and such that a failure of one of the valves to seal upon closure will not affect the ability of the other valve to seal upon closure.

The invention achieves the above objects in a magnetically actuated twin-valve system whereby the respective valves are series-connected within a single housing and in a single generally axial line of fluid flow from an upstream or inlet end to a downstream or outlet end, and wherein an annular electrical winding is operative to concurrently operate both valves for a like change of state in each valve. A generally toroidal configuration of magnetic-core elements is provided by generally cylindrical housing structure which includes annular end-closure elements and wherein the core path is completed by magnetic armature and pole-face features. The annular winding is magnetically coupled to the armatures and is contained within the generally toroidal configuration of magnetic-core elements. Separate springs axially preload the armatures in their valve-closed direction of engagement with annular valve-seat formations along the path of flow. And provision is made for independent testing of the sealing effectiveness of each valve closure, prior to operation of the twin-valve system.

BRIEF DESCRIPTION OF THE DRAWINGS

The invention will be described in detail in conjunction with the accompanying drawings, in which.

DETAILED DESCRIPTION

Figure 1:
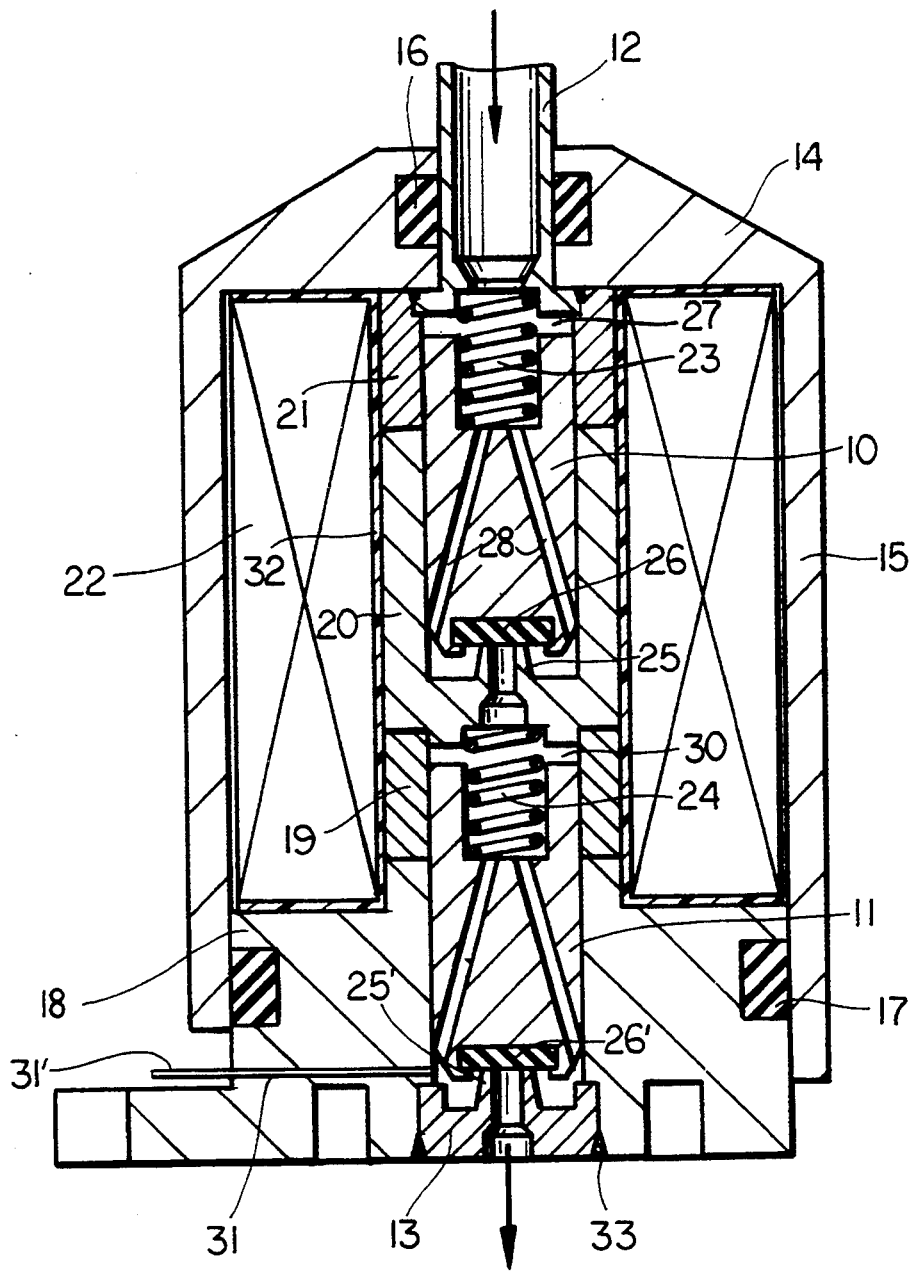
FIG. 1 is a simplified diagram in longitudinal section for a first embodiment.
Figure 1:
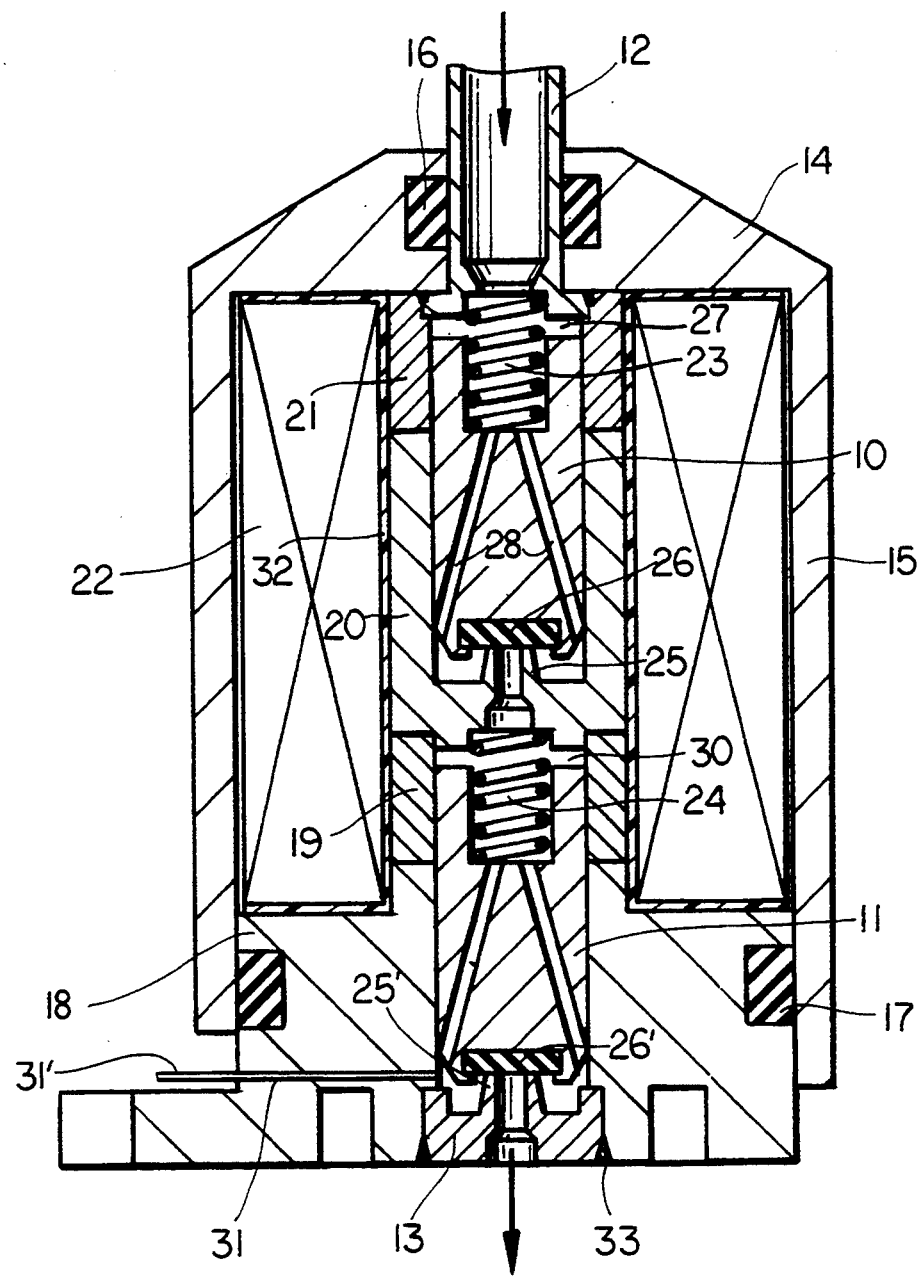

In the embodiment of FIG. 1, first and second like plunger-type valve-member armatures 10, 11 are independently guided in aligned upper and lower bores along a common, essentially single path of fluid flow between an upper-end or inlet member 12 and a lower-end or discharge member 13. The inlet member 12 is of magnetic material and completes the upper-end closure 14 of cylindrical outer housing structure or skirt 15, also of magnetic material, being peripherally sealed at 16. At its lower end, the cylindrical skirt 15 has similar circumferentially sealed fit at 17 to a lower-body closure or base member 18 of magnetic material having the lower-end or discharge member 13 fitted thereto. A cylindrical bore in base member 18 provides most of the guidance for limited axial displacement of the lower armature 11, and an annular member 19 of non-magnetic material provides a matching bore for the remainder of armature-11 guidance.

In turn, a cup-shaped core member 20 of magnetic material has seated fit to the upper end of the non-magnetic annular member 19; the bore of annular magnetic member 20 provides most of the guidance for limited axial displacement of the upper armature 10, and an annular member 21 of non-magnetic material provides a matching bore for the remainder of armature-10 guidance. The same diameter of outer cylindrical surfaces of members 19, 20, 21 defines, with skirt 15, an annular volume for containment of an annular winding 22 for electromagnetic actuation of both armatures 10, 11, as will become clear.

In the embodiment of FIG. 1, a compression spring (23, for armature 10; and 24, for armature 11) preloads each valve-member armature in the position shown, namely of valve-closed engagement with an annular seat formation. In the case of armature 10, the seat formation 25 is an integrally formed upward projection of a central passage through the closed end of member 20, for flow from the upper valve to and through the lower valve; sealing contact for upper-valve closure is via a popper element 26 carried at the lower end of armature 10 and compressible to permit a measure of armature-10 overtravel in the spring-loaded closed position of the upper valve. The upper end of armature 10 is an annular pole face in spaced confronting relation with a fixed annular pole face that is provided by the lower surface of a flanged lower end of inlet fitting 12. The space between these pole faces is a magnetic gap 27 spanned by the non-magnetic annular member 21. Divergent longitudinal passages 28 in armature 10 communicate pressure fluid through fitting 12 to pass directly to an annular space surrounding the valve seat 25, in readiness for further passage through the otherwise-closed end of magnetic member 20.

The construction and nature of lower-valve structure is basically the same as for upper-valve structure, and it is therefore unnecessary to repeat details. The lower valve receives such pressure fluid as may be discharged through seat 25, upon actuation of the upper valve to open condition, and lower-valve closure is achieved by sealing contact of a poppet element 26' in axially yielding loaded engagement with an integral seat formation in the lower or outlet fitting 13. In the case of the lower armature 11, an upper annular pole face of armature 11 confronts a fixed annular pole face at the bottom of member 20 and across a magnetic gap 30 that is spanned by the non-magnetic annular member 19.

The magnetic circuit to which winding 22 is coupled may be described as generally toroidal, wherein the closure end 14 of an outer cylindrical shell or housing member 15 of magnetic material is closed by inlet fitting 12 to define a fixed upper pole face across gap 27 to the upper pole-face end of armature 10. Magnetic-circuit continuity of a flux path within the toroidal configuration is established by the guiding adjacency of magnetic member 20 to the upper armature 10, whereby to establish a fixed upper pole face (i.e., the bottom of member 20) confronting the upper end face of lower armature 11 across the gap 30. In turn, the magnetic-circuit continuity of the central leg of the toroidal configuration is completed by the guiding adjacency of magnetic base member 18 to the lower armature 11. And of course the magnetic material of base member 18 is overlapped by magnetic skirt 15 to complete the circuit of a toroidal flux path.

A feature of structure in FIG. 1 is indicated at 31, which will be understood to be a drilled passage, of hypodermic-needle proportions, radially through base 18 to the annular space beneath armature 11, and around the region of lower-valve seating. The passage 31 preferably has an externally projecting crimpable or otherwise closable end 31' for a testing purpose to be described.

The described construction of FIG. 1 will be seen to be simple to assemble. For example, starting with the magnetic housing shell 15 with the central bore of its closed end 14 lined with the upper seal 16, the remaining parts may be a prepared subassembly that is inserted via the open lower end of skirt 15. This lower subassembly may comprise magnetic inlet fitting 12, flange-welded to the non-magnetic annular member 21, with a tubular insulating jacket 32 for winding 22 (internally locating members 20, 19 and 18,) and with the armatures 10, 11 and their loading springs in the described nested array. Final closure is effected by peripheral welding 33 of the outlet or lower valve-seat member 13 in a lower counterbore of base member 18. All that then remains is a pressure-fluid check to make sure of the sealing effectiveness of each individual popper member 26 (26') in its seat-engaged position of valve closure.

The small externally accessible passage 31, 31' to the space around the lower valve seat formation 25' provides for such checking for sealed effectiveness. To check for fidelity of upper-valve seal effectiveness, fluid pressure applied at inlet 12 will show a detectable leak at 31' if the upper valve-member seal is less than perfect. And to test for fidelity of lower valve-member seal effectiveness, fluid pressure via the externally accessible passage at 31' will show a leak at the discharge outlet of the lower valve-seat fitting 13 if the lower valve-member seal is less than perfect. And if both seals test to perfection, the external-access tube 31' may be crimped, welded shut, or otherwise closed, placing the entire structure in readiness for simultaneous actuation of both valves to open condition, upon electrical excitation of winding 22.

Figure 2:
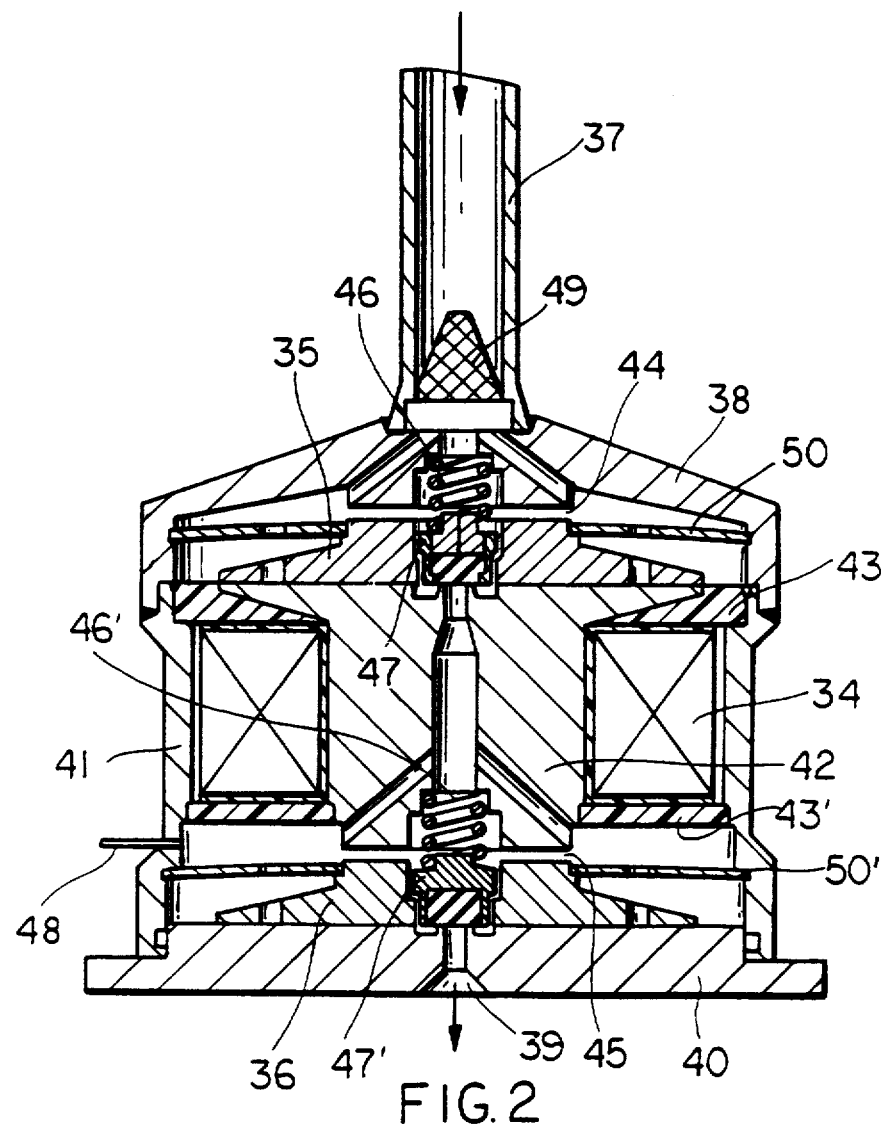
FIG. 2 is a similar diagram for a second embodiment.

The embodiment of FIG. 2 is another twin-valve system which is magnetically linked such that a single electrical actuation signal to winding means 34 can simultaneously open (i) an upper valve by upwardly displacing an upper valve-member armature 35 as well as (ii) a lower valve by upwardly displacing a lower valve-member armature 36. Both of these valves are series-connected on a single line of fluid flow on the central axis of symmetry of the system, from an inlet 37 carried by the upper-end closure 38 of a housing of magnetic material, to an outlet 39 central to a base member 40 of magnetic material. A cylindrical annulus 41 of magnetic material completes the outer continuity of a generally toroidal flux path via the magnetic parts; and an axially central annular body 42 of magnetic material is fixedly supported by non-magnetic means 43, 43', such that the upper armature 35 can be accommodated for actuated upward displacement to close an upper gap 44, and such that simultaneously the lower armature 36 can be accommodated for actuated upward displacement to close a lower gap 45. Both of these actuations are against spring preloading 46, 46' of poppets 47, 47' carried by the respective armatures 35, 36; and upstanding annular valve-seat formations, 48 in the upper end of central body 42, and 48 in the upper end of base 40, are closed by popper engagement when in the closed position.

For stabilized central positioning of armature 35, an axially compliant member 50 of non-magnetic material is shown; preferably, for minimum friction, member 50 comprises spaced inner and outer ring features with plural angularly spaced integrally formed spiral-twist arm connections between the spaced rings. An identical axially compliant member 50' serves for centrally stabilized location of armature 36.

The respective armatures 35, 36 may be further described as annular discs, each of which features a lower pole-face surface of noticeably greater area than the noticeably lesser area of an upper pole-face surface. The upper pole face of upper armature 35 is shown to confront, across gap 44, a downwardly facing fixed pole-face formation of the upper-end closure 38 of the magnetic housing; both of these confronting pole faces across gap 44 are of like, preferably matching configuration and of the indicated lesser area. For the valve-closed position shown, the lower pole face of armature 35 is seated against an upwardly facing pole face formation of the central body 42, the same being outwardly flared to assure substantially matching conformation to the indicated adjacent greater-area pole face of armature 35. Similar structural relations are seen to exist for the lower valve, in that the upper surface of armature 36 is of the indicated lesser area and is matched by a fixed downwardly dependent pole-face formation of central body 42, while the indicated larger-area bottom pole face of armature 36 is well-accommodated in its valve-closed position of adjacency to the upper surface of base 40.

When stimulated by electrical excitation of winding 34, magnet flux passes through the upper to lower pole faces of the upstream armature 35, then the same flux passes down through the upper to lower pole faces of the lower armature 36, returning to complete its generally toroidal path via base 40 and housing members 41, 38. At initial observation, one might ask why the armatures 35, 36 will be urged to move upward, since attracting forces will exist at both the upper and lower pole faces of each armature. This is true, but the force across the gap at the upper pole face of each valve substantially exceeds the force at the lower pole face of each valve, thus creating a net force in the valve-opening direction, as will appear from the following analysis, which deals with attracting force acting on each armature pole, namely, the equation:

$$F_p = \frac{\theta_t^2}{r^2 \times 72 \times A_p}$$

where:
$F_p$ = Attracting Force at the pole, lbs.
$\theta_t$ = Total magnetic flux in the armature, Kilomaxwells
r = Pole flux leakage factor, $$\frac{\theta_t}{\theta_p},$$

total armature flux/pole flux
$A_p$ = Area of pole, in$^2$
Letting:
u = Subscript to indicate upper pole face
l = Subscript to indicate lower pole face
The ratio of upper pole to lower pole force is:

$$\frac{F_{pu}}{F_{pl}} = \frac{\theta_t^2 \times (r_l^2 \times 72 \times A_{pl})}{\theta_t^2 \times (r_u^2 \times 72 \times A_{pu})}$$

The $\theta_t^2$ and "72" terms cancel out:

$$\frac{F_{pu}}{F_{pl}} = \frac{r_l^2 \times A_{pl}}{r_u^2 \times A_{pu}}$$

For purposes of illustration, let the lower pole face have 6 times the area of the upper pole face. Typically, the upper pole flux leakage factor = 1.2, and the lower pole flux leakage factor = 1.0, $$\frac{F_{pu}}{F_{pl}} = \frac{(1.0)^2 \times 6 A_{pu}}{(1.2)^2 \times A_{pu}}$$

$$\frac{F_{pu}}{F_{pl}} = \frac{6}{1.44}$$

$$\frac{F_{pu}}{F_{pl}} = 4.17$$

The upper pole force is four times the lower pole force, thus providing a net force in the valve-opening direction, when winding 34 is excited.

The described embodiments will be seen to have achieved all stated objects. In both cases, the same single flux path links both the upper and the lower armature, for simultaneous actuation, and in the embodiment of FIG. 2, friction is at near-zero in the armature suspensions, in that the thin axially compliant non-magnetic flexure 50 (50') may be perforated from sheet metal to define spiral-like cantilever beams which connect the inner and outer rings. Also, in FIG. 2, spring action on the poppets, with armature overtravel of the poppets in the valve-closed position, minimizes the seating-impact load and allows each poppet to freely and evenly self-align itself on its seat; this is a particularly important feature of the embodiment of FIG. 2, because the armatures are of such relatively large size and diameter.

The test feature described at 31, 31' is also of importance, after final assembly of all of the involved parts, and the same feature is suggested at test inlet passage 49 in FIG. 2.

Both embodiments of the invention provide an inherent ability to relieve pressure to the inlet connection (12, 37) in the event that liquid trapped between valve seats should expand due to a temperature increase. This is of particular importance when either embodiment is used as a thrust-valve system for liquid monopropellant (hydrazine), since heat from an associated thruster-injector or thrust chamber can soak back into the valve when the thruster is turned off, by closure of the described valve systems. And both embodiments lend themselves to filtering at the inlet, as suggested at 51 in the case of FIG. 2.

Although a single coil (22, 34) has been described for actuation of each valve system, it will be understood that two like coils, not shown but accommodated in the same space shown for either of coils 22 or 34, may be equally applicable as for example to provide electrical excitation redundancy, in that they would in any event be magnetically linked to one and the same single magnetic circuit.

What is claimed is:

1. A magnetically actuated twin-valve system, wherein two like valves are series-connected in a single generally axial line of fluid flow between upstream and downstream ends and wherein annular electrical-winding means is operative to concurrently actuate both valves for a like change of state in each valve, a single generally toroidal configuration of magnetic core elements wherein said winding means is contained within a single torodial volume defined between inner and outer generally annular core-path members and within spaced end-closure core-path members, first and second axially fixed and axially spaced valve-seat formations along said line of fluid flow, said inner core-path members including two like valve-member armatures each of which is guided for axial displacement in a gap between an upper valve-open position and a lower valve-closed position of seating closure of one to the exclusion of the other of said valve-seat formations, and separate springs preloaded against the respective valve-member armatures in the direction of valve-closing displacement.

2. The twin-valve system of claim 1, wherein said configuration of magnetic-core elements includes a closed housing having an inlet port at a first closed end and an outlet port at a second and opposite closed end.

3. The twin-valve system of claim 1, wherein said valve-member armatures are cylindrical, and wherein each armature is guided for axial displacement in its own guide bore comprising an upper annular member of non-magnetic material and a lower annular member of magnetic material, said upper non-magnetic member providing guidance of a first of said valves spanning the axial-displacement gap of said first valve, and said upper non-magnetic member providing guidance of the second of said valves spanning the axial-displacement gap of said second valve.

4. The twin-valve system of claim 1, wherein said annular winding means comprises a single electrical winding that is common to the actuation of both said valve-member armatures.

5. The twin-valve system of claim 1, wherein said annular winding means comprises two annular electrical windings magnetically linked to said inner core-path members for magnetically-linked redundant electromagnetic actuation of both of said valve-member armatures.

6. A magnetically actuated twin-valve system, wherein two like valves are series-connected in a single line of fluid flow, an elongate cylindrical housing of magnetic material closed at its respective ends and having a system-inlet port central to one end and a system-outlet port central to the other end, first and second like cylindrical valve members of magnetic material each having a flow passage between its upstream end and a downstream-end location that is radially outside a central valve-seat engageable location, magnetically isolated annular magnetic body members in axially stacked array and providing separate upper and lower cylindrical bores for guidance of the respective valve members; said body members for guidance of the upper valve member comprising an annular upper non-magnetic body member and a lower magnetic body member establishing a closure wall for the upper bore and providing an upstanding annular valve-seat formation positioned for upper valve-member closure of a central first-stage outlet port for discharge of flow from upper valve-member control to lower valve-member control; the body members for guidance of the lower valve member comprising an annular upper non-magnetic body member in axial adjacency to said closure wall, and a lower magnetic body member establishing (1) closure of the lower end of said housing and (ii) a closure wall for the lower bore and (iii) an upstanding annular valve seat formation positioned for lower valve-member closure of said system-outlet port; said upper valve member in its valve-closed position establishing a first axial magnetic-gap relation with the upper end of said housing, and said lower valve member in its valve-closed position establishing a second axial magnetic-gap relation with the closure wall of the magnetic body member for guidance of the upper valve member; separate spring means resiliently loading each valve member to its closed position of valve-seat member engagement; said elongate cylindrical housing, said valve members, said magnetic body members, and said closure walls constituting a single generally toroidal configuration for a single flow of magnetic flux through both valve members; and elongate annular excitation winding means within said housing and in longitudinal overlap with said magnetic body members, said magnetic body members being in only partial overlap with their respective associated valve members, whereby, upon electrical excitation of said winding means, both valve members may be actuated into open condition of disengagement from their respective seats and further whereby, upon termination of the electrical excitation, the resilient loading of the respective valve members will provide series-redundant shut-off of said single line of fluid flow.

7. A magnetically actuated twin-valve system, comprising two like valves which are series-connected and axially spaced in a single generally axial line of fluid flow between upstream and downstream ends, each of said valves including a valve member of magnetic material wherein said valve members form spaced axially displaceable elements of a single central axially extending inner-core path for conduct of magnetic flux, said inner-core path further including a pole piece for each valve member establishing a separate gap to be closed in displacement of each valve member in response to an excitation flow of flux in said inner path, an elongate tubular housing of magnetic material having end closures to complete with said inner-core path a single generally toroidal path through both pole pieces and both valve members via both gaps, said tubular housing being otherwise radially spaced from said inner core path, and excitation-winding means contained within said radial space and in inductively coupled relation to said inner-core path.

8. A magnetically actuated twin-valve system, wherein two like valves are series-connected in a single generally axial line of fluid flow between upstream and downstream ends and wherein annular electrical-winding means is operative to concurrently actuate both valves for a like change of state in each valve, a single generally toroidal configuration of magnetic core elements wherein said winding means is contained within a single toroidal volume defined between inner and outer generally annular core-path members and within spaced end-closure core-path members, first and second axially fixed and axially spaced valve-seat formations along said line of fluid flow, said inner core-path members including two like valve-member armatures each of which is guided for axial displacement in a gap between an upper valve-open position and a lower valve-closed position of seating closure of one to the exclusion of the other of said valve-seat formations, separate springs preloaded against the respective valve-member armatures in the direction of valve-closing displacement, and a local test passage through one of said core-path member providing external venting access to said line of fluid flow at a location between the upper valve-seat formation and the lower valve-member armature, said passage providing the means of independently sensing any leakage flow for the closed condition of the upstream one of said valves in the presence of fluid-pressure supply to the upstream end of said line, said passage also providing the means of independently sensing any leakage flow for the closed condition of the downstream one of said valves in the presence of fluid-pressure supply via said passage to the downstream end of said line, said passage being closable after such sensing for possible leakage in said valves when in valve-closed condition.

9. A magnetically actuated twin-valve system, wherein two like valves are series-connected in a single generally axial line of fluid flow between upstream and downstream ends and wherein electrical-winding means is operative to concurrently actuate both valves for a like change of state in each valve, a generally toroidal configuration of magnetic-core elements including a closed housing having an inlet port at a first closed end and an outlet port at a second and opposite closed end, said winding being contained within a toroidal volume defined between inner and outer generally annular core-path members and within spaced end-closure core-path members at said respective closed ends; first and second axially fixed and axially spaced valve-seat formations along said line of fluid flow, said inner core-path members including two like valve-member armatures each of which is guided for axial displacement in a gap between an upper valve-open position and a lower valve-closed position of seating closure of one to the exclusion of the other of said valve-seat formations, and separate springs preloaded against the respective valve-member armatures in the direction of valve-closing displacement; said configuration of magnetic-core elements comprising an elongate central member having an upper pole-face end of greater area than a lower-pole face end of lesser area, said central element being fixedly positioned by non-magnetic means having fixed stabilizing reference to the outer core-path member, with said winding means magnetically coupled to said central element, the upper end-closure core-path member having a central downwardly facing pole-face formation of said lesser area in a first axially spaced confronting relationship with the upper pole-face end of said central member, the lower end-closure core-path member having an upwardly facing lower pole-face of at least said greater area in a second axially spaced confronting relation with the lower pole-face end of said central member, first and second like valve-member armature discs axially compliantly suspended within the respective first and second spaced confronting relationships, each of said discs having an upper pole face of substantially said lesser area and a lower pole face of substantially said greater area, and spring means urging each of said discs to its valve-closed position of greater-area pole-face adjacency.

10. The twin-valve system of claim 9, wherein a path of series-connected flow control via said valves is established via a central passage in each of said pole faces, there being an annular valve-seat formation in the upper pole-face end of said central member for valve coaction with one of said discs, and there being an annular valve-seat formation in the pole-face area of the lower core-path member for valve coaction with the other of said discs.

11. The twin-valve system of claim 9, in which the area proportion of said greater area with respect to said lesser area is in the range of at least 3:1.

12. The twin-valve system of claim 9, in which the area proportion of said greater area with respect to said lesser area is in the range of approximately 5:1 to 7:1.

* * * * *

UNITED STATES PATENT AND TRADEMARK OFFICE
CERTIFICATE OF CORRECTION

PATENT NO. : 5,450,876
DATED : September 19, 1995
INVENTOR(S) : Robert H. Reinicke It is certified that error appears in the above-identified patent and that said Letters Patent is hereby corrected as shown below:

Drawings:

The Drawing sheet 2 of 2 consisting of Fig. 1, should be deleted to be replaced with the drawing sheet, consisting of Fig. 2, as shown on the attached page.

Signed and Sealed this

Nineteenth Day of December, 1995

*Attest:*

BRUCE LEHMAN

*Attesting Officer*     *Commissioner of Patents and Trademarks*